US012705987B2

(12) United States Patent
Pugach

(10) Patent No.: US 12,705,987 B2
(45) Date of Patent: Aug. 11, 2026

(54) SYSTEMS AND METHODS FOR CHANNEL BASED DRONE OPERATION

(71) Applicant: DISH Ukraine L.L.C., Kharkov (UA)

(72) Inventor: Sergiy Pugach, Kharkov (UA)

(73) Assignee: DISH Ukraine L.L.C., Kharkov (UA)

( * ) Notice: Subject to any disclaimer, the term of this patent is extended or adjusted under 35 U.S.C. 154(b) by 15 days.

(21) Appl. No.: 18/728,843

(22) PCT Filed: Jan. 17, 2022

(86) PCT No.: PCT/UA2022/000003
§ 371 (c)(1),
(2) Date: Jul. 12, 2024

(87) PCT Pub. No.: WO2023/136802
PCT Pub. Date: Jul. 20, 2023

(65) Prior Publication Data

US 2025/0111789 A1 Apr. 3, 2025

(51) Int. Cl.

| | |
|---|---|
| ***G08G 5/32*** | (2025.01) |
| ***B64U 20/87*** | (2023.01) |
| ***B64U 101/29*** | (2023.01) |
| ***G08G 5/57*** | (2025.01) |
| ***H04N 21/2187*** | (2011.01) |

(52) U.S. Cl.
CPC ............... *G08G 5/32* (2025.01); *B64U 20/87* (2023.01); *G08G 5/57* (2025.01); *H04N 21/2187* (2013.01); *B64U 2201/20* (2023.01)

(58) Field of Classification Search
CPC .. G08G 5/32; G08G 5/57; G08G 5/51; G08G 5/54; G08G 5/56; B64U 20/87; B64U 2201/20; H04N 21/2187
USPC .......................................................... 701/2
See application file for complete search history.

(56) References Cited

U.S. PATENT DOCUMENTS 3,778,007 A * 12/1973 Kearney .................. F41G 7/30 244/3.14
2010/0269143 A1* 10/2010 Rabowsky ......... H04B 7/18591 725/63
2015/0346722 A1* 12/2015 Herz ...................... G01S 19/13 701/2
2016/0266579 A1* 9/2016 Chen .................... G05D 1/0044
(Continued)

OTHER PUBLICATIONS

PCT/UA2022/000003, International Search Report and Written Opinion mailed Aug. 9, 2022, 15 pgs.

*Primary Examiner* — Manglesh M Patel
(74) *Attorney, Agent, or Firm* — Ashurst Perkins Coie US LLP

(57) ABSTRACT

A method for operating one or more drones including providing at least one user with one or more drone options for viewing corresponding drone video and receiving a drone selection from the at least one user. Video from the selected drone can be streamed to a display device associated with the at least one user. The method can include indicating to the at least one user that the selected drone is available for user control and providing the at least one user with one or more control options including one or more predefined flight path options available for the selected drone. The method can include receiving a control option selection from the one or more control options and upon receiving a flight path option selection, directing the drone to follow the selected flight path.

20 Claims, 7 Drawing Sheets

| DRONE | Descripition | Control | Available | Waitlist | Channel |
|---|---|---|---|---|---|
| Drone 1 | Eiffel Tower | Circle | Yes | - | 10 |
| Drone 2 | COTA | Turn 1 | No | 2 | 11 |
| Drone 3 | Mile High | Direct | Yes | - | 12 |
| Drone 4 | Gulch Fire | Engine 2 | No | 4 | 13 |

(56) References Cited

U.S. PATENT DOCUMENTS

2017/0092109 A1 3/2017 Trundle et al.
2017/0187993 A1 6/2017 Martch et al.
2018/0292844 A1* 10/2018 Kosseifi .................. G08G 5/26
2020/0106818 A1* 4/2020 Luong .................... H04L 67/12
2021/0088337 A1 3/2021 Koubaa

* cited by examiner

| DRONE | Description | Control | Available | Waitlist | Channel |
| --- | --- | --- | --- | --- | --- |
| Drone 1 | Eiffel Tower | Circle | Yes | - | 10 |
| Drone 2 | COTA | Turn 1 | No | 2 | 11 |
| Drone 3 | Mile High | Direct | Yes | - | 12 |
| Drone 4 | Gulch Fire | Engine 2 | No | 4 | 13 |

SYSTEMS AND METHODS FOR CHANNEL BASED DRONE OPERATION

BACKGROUND

Drones can provide a good way to view events and landmarks, for example. However, commercial grade drones and supporting equipment for providing aerial video footage can be expensive and difficult to maintain. Furthermore, it may not be practical for individuals to maintain or transport a drone to all of the different venues or landmarks that they wish to view. Therefore, there is a need to provide on demand drones that can send aerial video footage from a variety of venues and/or landmarks.

SUMMARY

Disclosed herein are systems and methods for channel-based drone operation. In some embodiments, a method for operating one or more drones can include providing at least one user with one or more drone options for viewing corresponding drone video and receiving a drone selection from the at least one user. Video from the selected drone can be streamed to a display device associated with the at least one user. The method can include indicating to the user that the selected drone is available for user control and providing the user with one or more control options including one or more predefined flight path options available for the selected drone. The method can include receiving a control option selection from the one or more control options and upon receiving a flight path option selection, directing the drone to follow the selected flight path.

In some embodiments, when the drone is unavailable for user control, the method can include indicating to the user that the user is on a wait list for control of the selected drone. In some implementations, the one or more control options can include a direct control option and upon receiving a selection of the direct control option, establishing communication between a mobile device associated with the user and the selected drone, whereby the user has direct control of the selected drone via the mobile device. In some embodiments, the video from the selected drone is streamed to the display device via a set-top box. In some embodiments, the one or more drone options can be presented on the display device via a set-top box. In some embodiments, the drone selection can be received from a remote control associated with the set-top box. In some implementations, the one or more control options are presented on the display device via a set-top box.

In some embodiments, a system for operating one or more drones can include one or more video capable drones, a set-top box, and a flight control system. The set-top-box can be configured to provide a user with one or more drone options, corresponding to the one or more video capable drones. The set-top-box can be configured to receive a drone selection from a remote control associated with the set-top box. Video from the selected drone can be streamed to a display device connected to the set-top box. The system can indicate to the user that the selected drone is available for user control and provides the user with one or more control options including one or more predefined flight path options available for the selected drone. In some embodiments, the flight control system is configured to receive a control option selection from the one or more control options and upon receiving a flight path option selection, direct the drone to follow the selected flight path.

In some embodiments, the set-top box is further configured to indicate to the user that the user is on a wait list for control of the selected drone when the drone is unavailable for user control. In some embodiments, the one or more control options includes a direct control option and upon receiving a selection of the direct control option, the flight control system establishes communication between a mobile device associated with the user and the selected drone, whereby the user has direct control of the selected drone via the mobile device. In some embodiments, the flight control system is configured to establish limits on the direct control of the selected drone including an altitude floor and an altitude ceiling. In some embodiments, the one or more control options includes at least one option to track a participant in a sporting event. In some embodiments, the flight control system is configured to limit the amount of time the user can control the selected drone.

In some embodiments, one or more non-transitory computer-readable media stores computer-executable instructions that, when executed by one or more processors, cause the one or more processors to perform operations. The operations can include providing at least one user with one or more drone options for viewing corresponding drone video and receiving a drone selection from the at least one user. The operations can also include streaming video from the selected drone to a display device associated with the user. In some embodiments, the operations can include indicating to the user that the selected drone is available for user control and providing the user with one or more control options including one or more predefined flight path options available for the selected drone. The operations can include receiving a control option selection from the one or more control options and upon receiving a flight path option selection, directing the drone to follow the selected flight path.

In some embodiments, when the drone is unavailable for user control, the operations include indicating to the user that the user is on a wait list for control of the selected drone. In some embodiments, the operations also include providing the at least one user with a direct control option and upon receiving a selection of the direct control option, establishing communication between a mobile device associated with the user and the selected drone. In some embodiments, the video from the selected drone is streamed to the display device via a set-top box. In some embodiments, the one or more drone options can be presented on the display device via a set-top box. In some embodiments, the drone selection is received from a remote control associated with the set-top box. In some embodiments, the one or more control options are presented on the display device via a set-top box.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
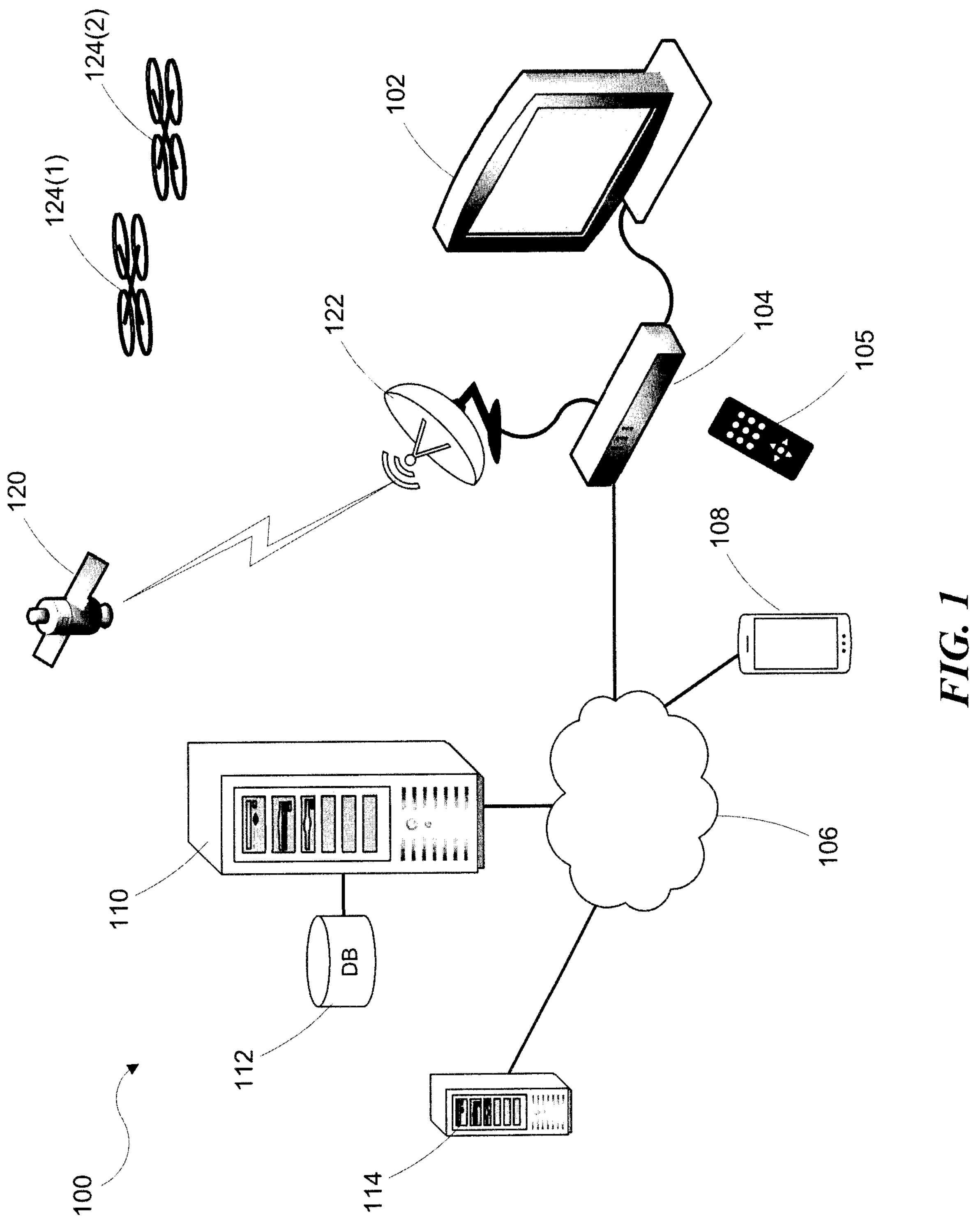
FIG. 1 is a diagram illustrating an overview of an environment in which some implementations can operate according to embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Drones can provide a good way to view events, landmarks, and new events, for example. The disclosed technology provides on demand drones that can send aerial video footage from a variety of venues and/or landmarks. The disclosed systems and methods allow a user to select a drone based on its location, such as a particular landmark or venue, from a user interface on a set-top-box. The system also allows the user to select between one or more predefined flight paths or direct control. The direct control option can enforce limits on the drone's altitude and proximity to buildings, for example. The selected drone streams video footage to the user's set-top-box and/or an associated mobile device. The predefined flight paths can be selected via the set-top-box with a remote control for example. The direct control option can be implemented by establishing communication between the drone and the user's mobile device to provide near real-time control without latency in the flight commands.

FIG. 1 illustrates an example simplified block diagram of a system 100 for operating one or more drones 124(1) and 124(2). The system 100 can include, a television 102, a set-top box (STB) 104, a remote control 105, a controller 110, an options database 112, the drones 124(1) and 124(2), and optionally a cloud environment 106. The system 100 can also include or be in communication with a flight control system 114. Optionally, the system 100 can include or be in communication with a user device 108. The user device 108 can be a desktop computer or a mobile device, such as a cellular telephone, a tablet computer, a smartwatch, or any other mobile device. While depicted separately, STB 104, controller 110, and flight control system 114 can optionally be combined into a single computer system.

In some examples, the STB 104 can be in communication with a satellite-based television distribution system via a satellite dish 122. Satellite-based television distribution systems often include one or more satellites 120 and satellite transmission equipment (not shown). Although the system is described with respect to a satellite-based distribution system, cable, IP-based, wireless, and broadcast focused systems are also possible. While only one satellite dish 122, STB 104, and display device 102 (collectively referred to as "user equipment") are illustrated, it should be understood that multiple (e.g., tens, thousands, millions of) instances and types of user equipment may receive data and television signals from satellite-based television distribution systems (e.g., satellite 120).

In some embodiments, the drones 124(1) and 124(2) can communicate video to the STB 104 and display 102 via the satellite-based television distribution system (e.g., satellite dish 122 and satellite 120). In some embodiments, the drones 124(1) and 124(2) can be controlled with a lightweight messaging protocol, such as MAVLink, communicated by 4G modem or mobile device 108, for example. In some implementations, the flight commands are communicated from the flight control system 114. In other implementations, flight commends are communicated directly from the mobile device 108. In some embodiments, the system 100 can also include drone ports (not shown) for charging the drones 124(1) and 124(2). These charging stations can be deployed near the location of each drone to allow the drones to periodically return in order to charge the drone's batteries.

Figure 2:
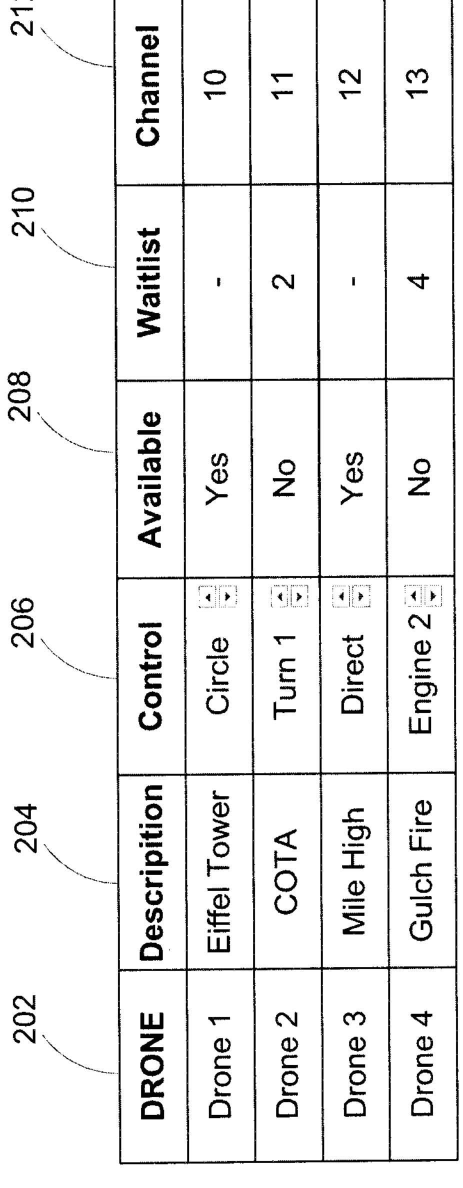
FIG. 2 illustrates a graphical user interface configured for presenting available drone options according to embodiments of the disclosed technology.

FIG. 2 illustrates a graphical user interface (GUI) in the form of a table 200 containing multiple drone options 202 for viewing corresponding drone video. Each drone option i.e., Drone 1-Drone 4 can be presented on a specific channel 212 and have a corresponding description 204. For example, Drone 1 is deployed at a landmark, the Eiffel Tower; Drone 2 is deployed at a racetrack, Circuit of the Americas (COTA), Drone 3 is deployed at a football stadium, Denver Mile High; and Drone 4 is deployed on location for a news event, a local forest fire.

Table 200 can also provide a user with various control options 206. Each drone can have various predefined flight paths and/or direct control options. For example, Drone 1 can have a predefined circular flight path. Each predefined flight path can be defined according the features of the venue and/or characteristics of the covered event. For example, Drone 2 can have predefined flight paths associated with each turn e.g., Turn 1 of the racetrack. Drone 4 can be directed to follow a particular fire engine, for example. In some embodiments, when a drone is covering a sporting event, such as Drone 2 or Drone 3, the control options can include options for directing the drone to follow a particular driver or player. In some embodiments, the user can set flight paths for several drones at once in different places and observe them simultaneously on the display device. In this case the screen of the display device can be divided into several viewing regions. The user can also record video that is streaming from the drone(s) for future viewing and/or for distributing it to other users.

In some embodiments, table 200 can include information related to the availability of each drone. The table can indicate the availability 208 of each drone and when the drone is unavailable for user control, the table 200 can indicate to the user a position on a waitlist 210 for control of the corresponding drone.

In some embodiments, the drone options and control information can be obtained from the drone options database 112 provided by the satellite-based television distribution system via the one or more satellites 120 and/or network 106. The drone information can be stored on the STB 104 and transferred to database 112 or the information can be directly obtained from the satellite-based television distribution system for storage on database 112.

Figure 3A:
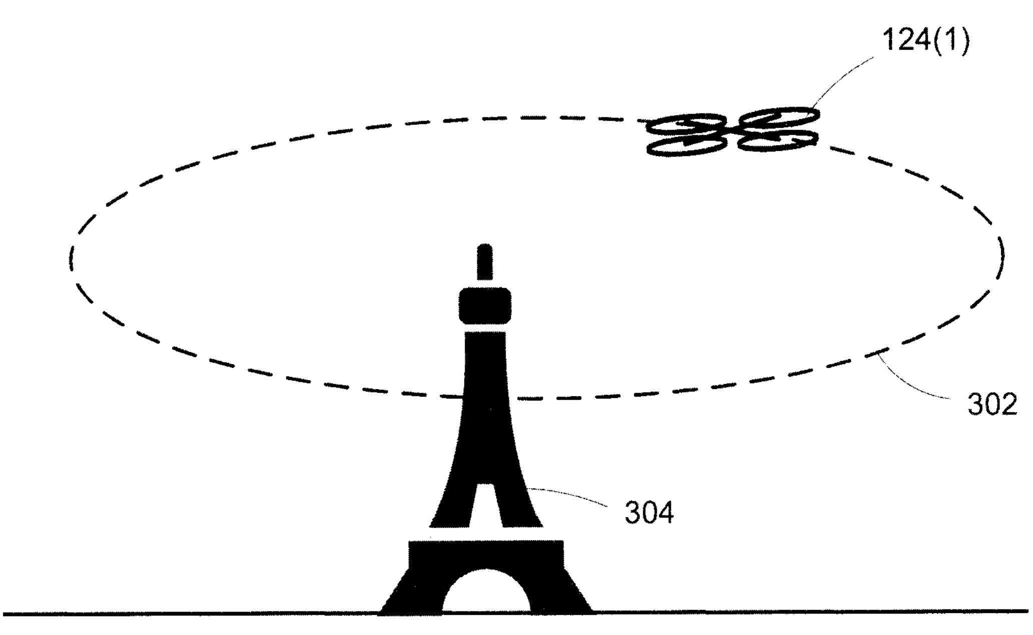
FIG. 3A illustrates a predefined drone flight path around a landmark according to embodiments of the disclosed technology.

With reference to FIG. 3A, a predefined flight path 302 can direct the drone 124(1) to automatically e.g., circle a landmark 304. While the depicted flight path is circular, other flight paths can be defined including changes in altitude direction and speed, for example. Furthermore, the system can provide the user with control over certain aspects of the drone's flight while following the predefined flight path 302. For example, a user can control speed, altitude, direction along the flight path, and camera functions such as zoom.

Figure 3B:
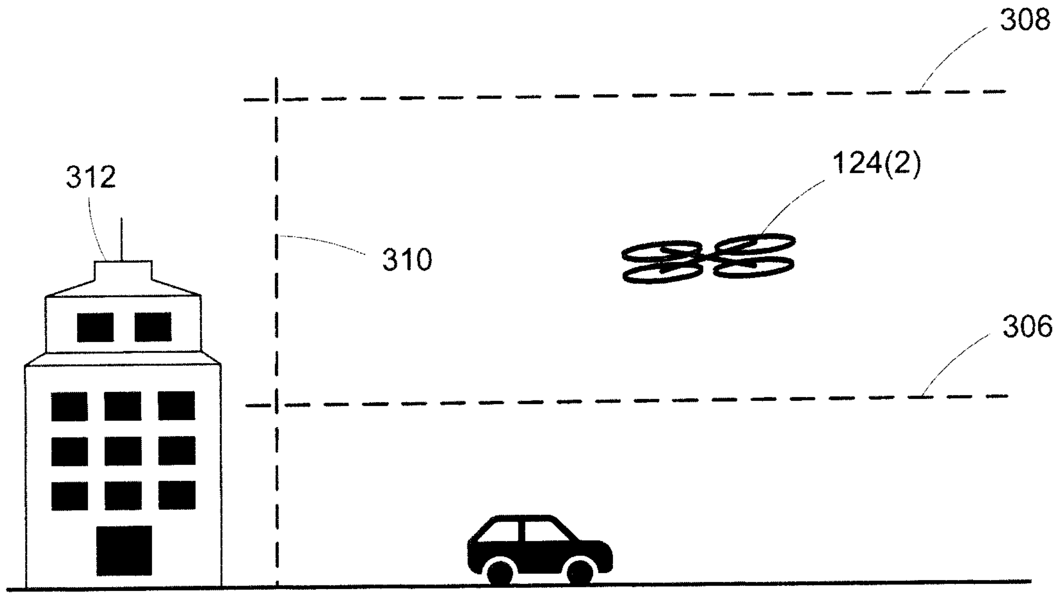
FIG. 3B illustrates flight limits for a direct controlled drone according to embodiments of the disclosed technology.

FIG. 3B illustrates that when the drone 124(2) is under a user's direct control, the system enforces limits on where the drone can fly. For example, there can be limits on the drone's altitude 306/308 and proximity 310 to buildings 312. Limits on altitude can include an altitude floor 306 and an altitude ceiling 308. In some embodiments, the flight control system can be configured to limit the amount of time a user can control the selected drone.

Figure 4:
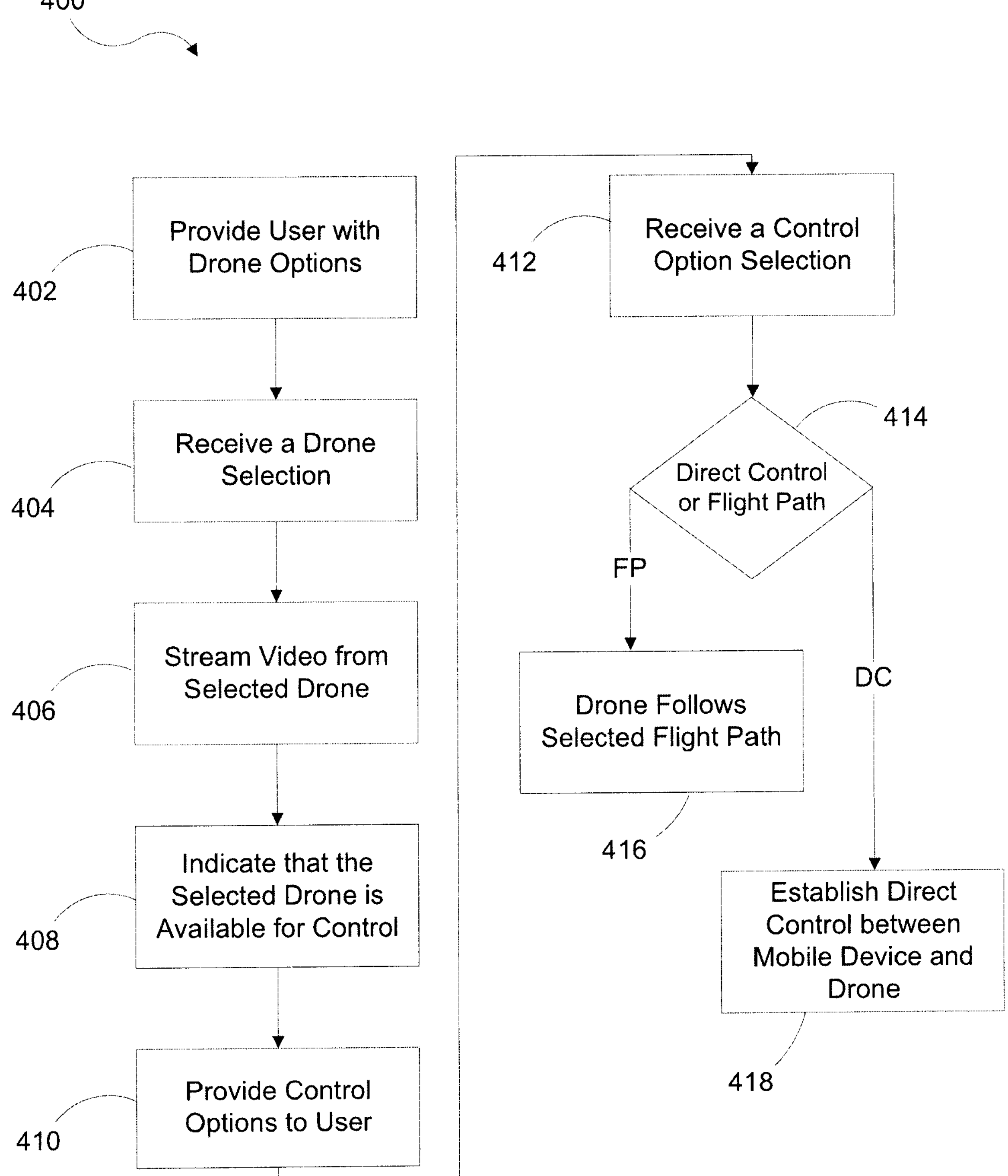
FIG. 4 is a flow diagram showing a method for operating one or more drones according to some embodiments of the disclosed technology.

FIG. 4 is a flow diagram showing a representative method of operation 400 of a processor-based system for operating one or more drones to provide streaming video to one or more users. The method 400 can include providing a user with one or more drone options for viewing corresponding drone video at step 402. In some embodiments, the one or more drone options can be presented on the display device via a set-top box. At step 404, a drone selection is received from the user. In some embodiments, the drone selection can be received from a remote control associated with the set-top box. Video from the selected drone is streamed to a display device associated with the user at step 406. In some embodiments, the video from the selected drone is streamed to the display device via a set-top box. The method can also include indicating to the user that the selected drone is available for user control at step 408 and providing the user with one or more control options at step 410. The control options can include one or more predefined flight path options available for the selected drone. In some embodiments, the one or more control options can be presented on the display device via a set-top box. At step 412 a control option selection is received from the one or more control options. If a predefined flight path is selected as step 414, the drone is directed to follow the selected flight path at step 416. If the direct control option is selected at step 418, direct control is established between the user's mobile device and the drone, whereby the user has direct control of the selected drone via the mobile device. In some embodiments, when the drone is unavailable for user control, the method can include indicating to the user that the user is on a wait list for control of the selected drone.

Suitable System

The techniques disclosed herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 5:
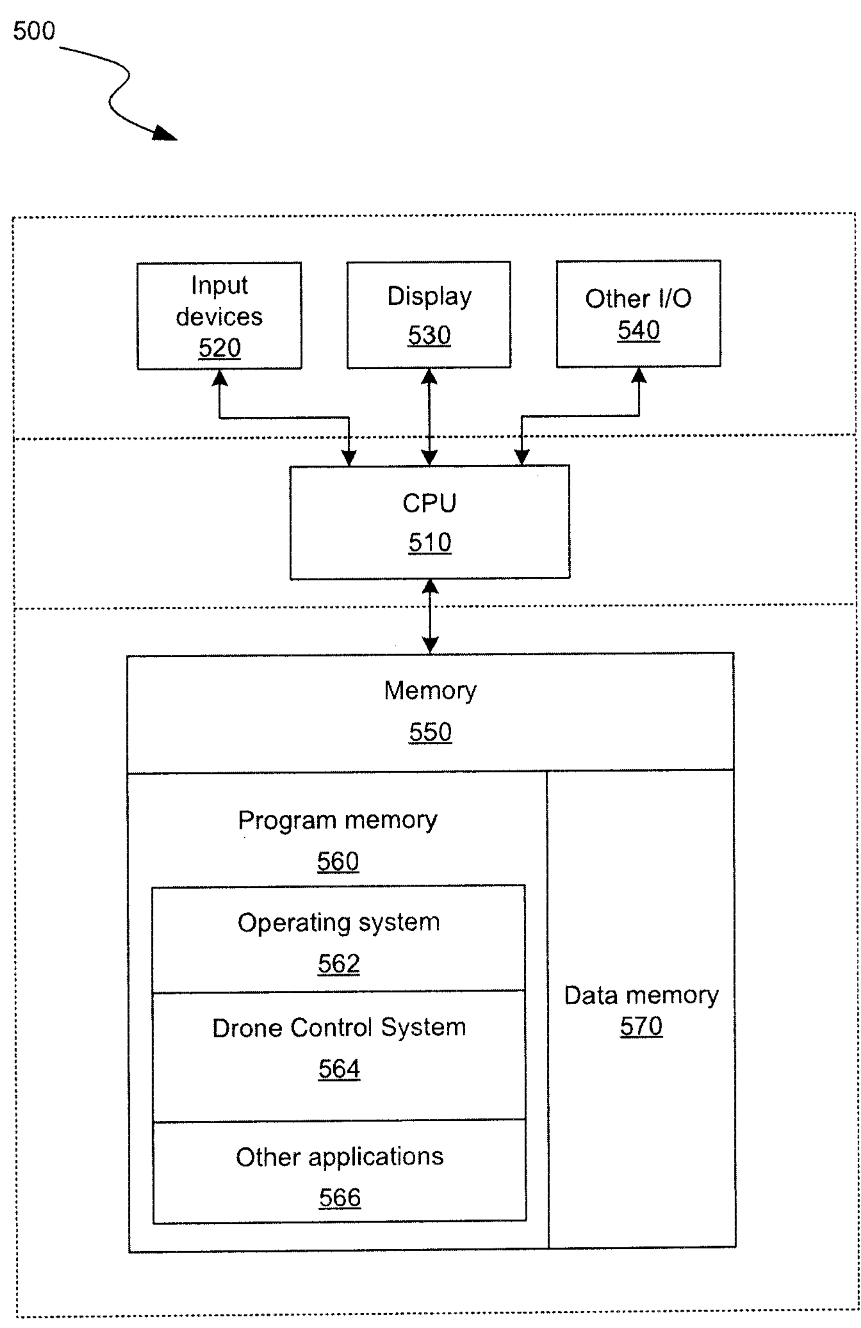
FIG. 5 is a block diagram illustrating an overview of devices on which some implementations can operate.

Several implementations are discussed below in more detail in reference to the figures. FIG. 5 is a block diagram illustrating an overview of devices on which some implementations of the disclosed technology can operate. The devices can comprise hardware components of a device 500. Device 500 can include one or more input devices 520 that provide input to the CPU (processor) 510, notifying it of actions. The actions are typically mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some examples, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices are: televisions; mobile devices; an LCD display screen; an LED display screen; a projected, holographic, or augmented reality display (such as a heads-up display device or a head-mounted device); and so on. Other I/O devices 540 can also be coupled to the processor, such as a network card, video card, audio card, USB, FireWire or other external device, camera, printer, speakers, CD-ROM drive, DVD drive, disk drive, or Blu-Ray device.

In some implementations, the device 500 also includes a communication device capable of communicating wirelessly or wire-based with a network node. The communication device can communicate with another device or a server through a network using, for example, TCP/IP protocols. Device 500 can utilize the communication device to distribute operations across multiple network devices.

The CPU 510 can have access to a memory 550. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software, such as an operating system 562, a drone control application 564, and other application programs 566. Memory 550 can also include data memory 570 that can include broadcast schedule information and/or wager information, etc., which can be provided to the program memory 560 or any element of the device 500.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 6:
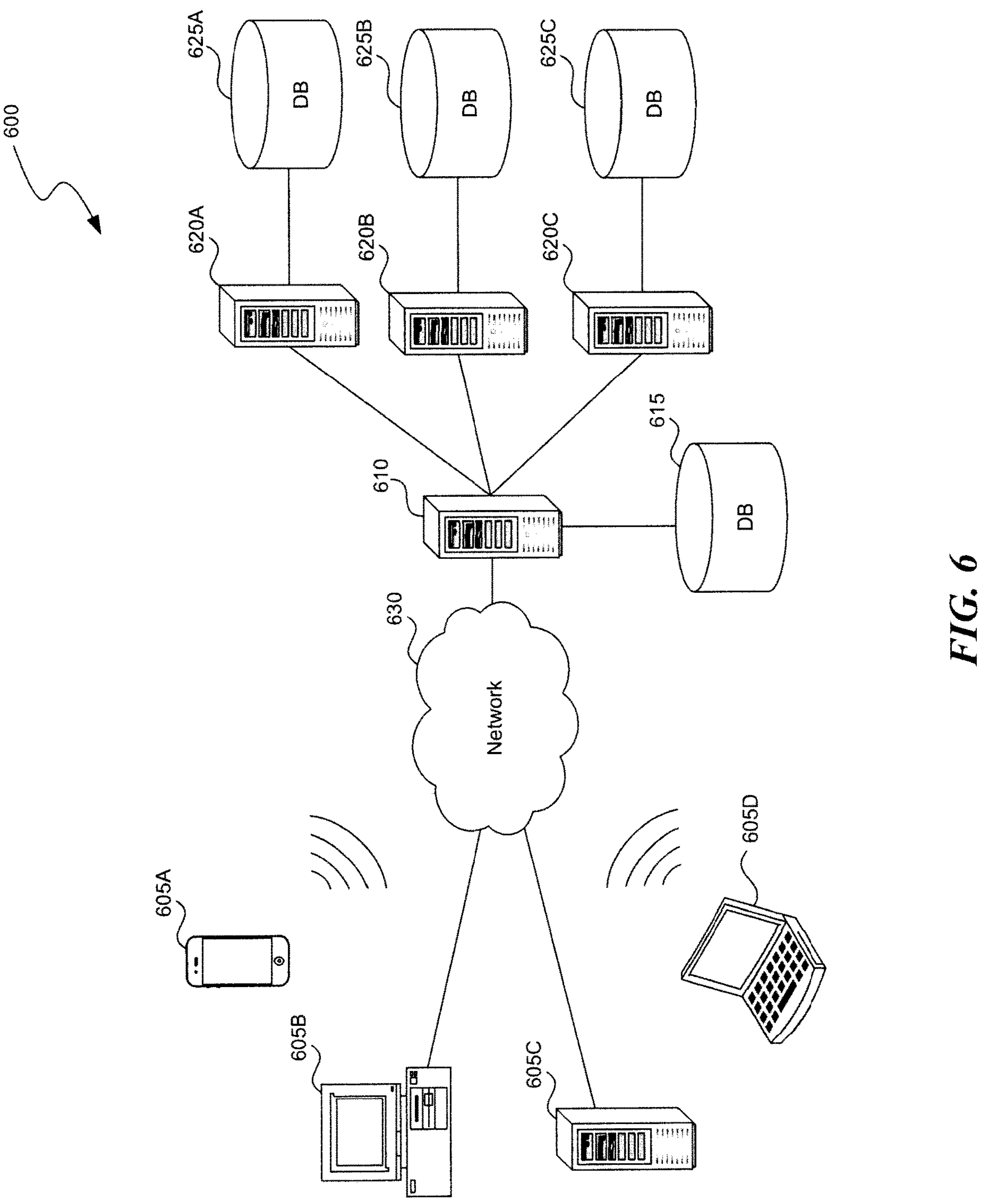
FIG. 6 is a block diagram illustrating an overview of an environment in which some implementations can operate.

FIG. 6 is a block diagram illustrating an overview of an environment 600 in which some implementations of the disclosed technology can operate. Environment 600 can include one or more client computing devices 605A-D, examples of which can include device 500. Client computing devices 605 can operate in a networked environment using logical connections through network 630 to one or more remote computers, such as a server computing device 610.

In some implementations, server computing device 610 can be an edge server that receives client requests and coordinates fulfillment of those requests through other servers, such as servers 620A-C. Server computing devices 610 and 620 can comprise computing systems, such as device 500. Though each server computing device 610 and 620 is displayed logically as a single server, server computing devices can each be a distributed computing environment encompassing multiple computing devices located at the same or at geographically disparate physical locations. In some implementations, each server computing device 620 corresponds to a group of servers.

Client computing devices 605 and server computing devices 610 and 620 can each act as a server or client to other server/client devices. Server 610 can connect to a database 615. Servers 620A-C can each connect to a corresponding database 625A-C. As discussed above, each server 620 can correspond to a group of servers, and each of these servers can share a database or can have their own database. Databases 615 and 625 can warehouse (e.g., store) information such as event, landmark, and venue information, drone operating parameters, predefined flight path information, and/or user preferences. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. Network 630 may be the Internet or some other public or private network. Client computing devices 605 can be connected to network 630 through a network interface, such as by wired or wireless communication. While the connections between server 610 and servers 620 are shown as separate connections, these connections can be any kind of local, wide area, wired, or wireless network, including network 630 or a separate public or private network.

Figure 7:
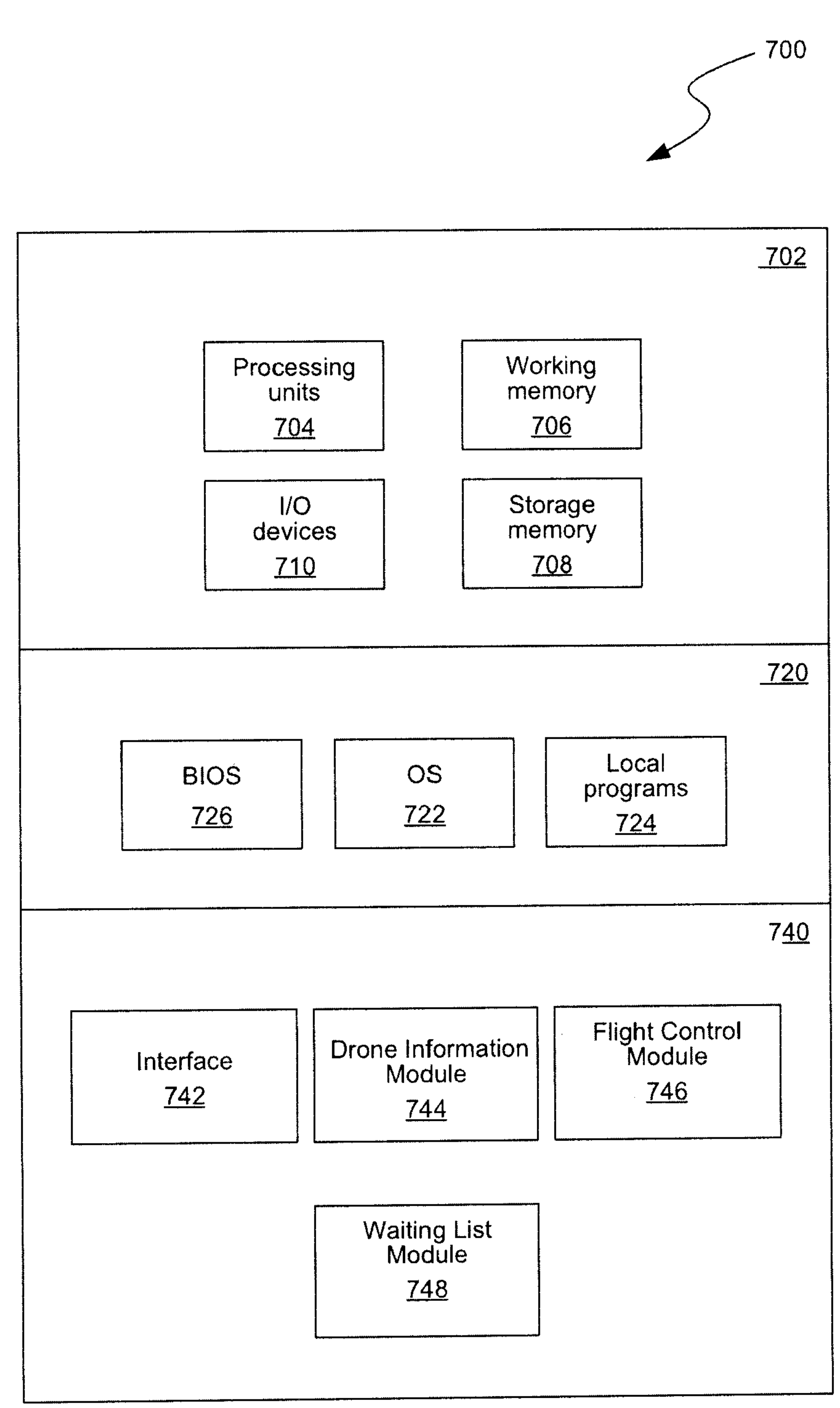
FIG. 7 is a block diagram illustrating components which, in some implementations, can be used in a system employing the disclosed technology.

FIG. 7 is a block diagram illustrating components 700 which, in some implementations, can be used in a system employing the disclosed technology. The components 700 include hardware 702, general software 720, and specialized components 740. As discussed above, a system implementing the disclosed technology can use various hardware, including processing units 704 (e.g., CPUs, GPUs, APUs, etc.), working memory 706, storage memory 708, and input and output devices 710. Components 700 can be implemented in a client computing device such as client computing devices 605 or on a server computing device, such as server computing device 610 or 620.

General software 720 can include various applications, including an operating system 722, local programs 724, and a basic input output system (BIOS) 726. Specialized components 740 can be subcomponents of a general software application 720, such as local programs 724. Specialized components 740 can include a drone information module 744, flight control module 746, waiting list module 748, and components that can be used for transferring data and controlling the specialized components, such as interface 742. In some implementations, components 700 can be in a computing system that is distributed across multiple computing devices or can be an interface to a server-based application executing one or more of specialized components 740.

Those skilled in the art will appreciate that the components illustrated in FIGS. 5-7 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for operating one or more drones, the method comprising:

providing at least one user with one or more drone options, wherein each of the one or more drone options corresponds to a drone for viewing corresponding drone video;

receiving a drone selection from the at least one user, wherein the drone selection indicates a selection of a drone from the one or more drones;

streaming, via a satellite based television distribution system in communication with the one or more drones, video from the selected drone to a display device associated with the at least one user;

indicating to the at least one user that the selected drone is available for user control;

providing the at least one user with one or more control options including one or more predefined flight paths for the selected drone;

receiving a selection of a control option from the one or more control options; and in response to the selected control option including a predefined flight path, directing the selected drone, via flight commands transmitted to the selected drone, to follow the predefined flight path, wherein the flight commands are communicated to the selected drone via a lightweight messaging protocol.

2. The method of claim 1, further comprising when the selected drone is unavailable for user control, indicating to the at least one user that the user is on a wait list for control of the selected drone.

3. The method of claim 1, wherein the one or more control options includes a direct control option; and upon receiving a selection of the direct control option, establishing communication between a mobile device associated with the at least one user and the selected drone, whereby the at least one user has direct control of the selected drone via the mobile device.

4. The method of claim 1, wherein the video from the selected drone is streamed to the display device via a set-top box.

5. The method of claim 1, wherein the at least one user with one or more drone options are presented on the display device via a set-top box.

6. The method of claim 5, wherein the drone selection is received from a remote control associated with the set-top box.

7. The method of claim 1, wherein the one or more control options are presented on the display device via a set-top box.

8. A system for operating one or more drones, the system comprising:

one or more video capable drones; and a set-top box configured to:

provide a user with one or more drone options, the one or more drone options corresponding to the one or more video capable drones;

receive a drone selection from a remote control associated with the set-top box, wherein the drone selection indicates a selection of a drone from the one or more drones;

stream, via a satellite based television distribution system in communication with the one or more drones, video from the selected drone to a display device connected to the set-top box;

indicate to the user that the selected drone is available for user control; and provide the user with one or more control options including one or more predefined flight paths for the selected drone; and a flight control system configured to:

receive a selection of a control option from the one or more control options; and in response to the selected control option including a predefined flight path, direct the selected drone, via flight commands transmitted to the selected drone, to follow the predefined flight path, wherein the flight commands are communicated to the selected drone via a lightweight messaging protocol.

9. The system of claim 8, wherein the set-top box is further configured to indicate to the user that the user is on a wait list for control of the selected drone when the drone is unavailable for user control.

10. The system of claim 8, wherein the one or more control options includes a direct control option; and upon receiving a selection of the direct control option, the flight control system establishes communication between a mobile device associated with the user and the selected drone, whereby the user has direct control of the selected drone via the mobile device.

11. The system of claim 10, wherein the flight control system is configured to establish limits on the direct control of the selected drone including an altitude floor and an altitude ceiling.

12. The system of claim 10, wherein the one or more control options include at least one option to track a participant in a sporting event.

13. The system of claim 10, wherein the flight control system is configured to limit the amount of time the user can control the selected drone.

14. One or more non-transitory computer-readable media storing computer-executable instructions that, when executed by one or more processors, cause the one or more processors to perform operations comprising:

providing at least one user with one or more drone options for viewing corresponding drone video from one or more drones;

receiving a drone selection from the at least one user, wherein the drone selection indicates a selection of a drone from the one or more drones;

streaming, via a satellite based television distribution system in communication with the one or more drones, video from the selected drone to a display device associated with the at least one user;

indicating to the at least one user that the selected drone is available for user control;

providing the at least one user with one or more control options including one or more predefined flight paths for the selected drone;

receiving a selection of a control option from the one or more control options; and in response to the selected control option including a predefined flight path, directing the selected drone, via flight commands transmitted to the selected drone, to follow the predefined flight path, wherein the flight commands are communicated to the selected drone via a lightweight messaging protocol.

15. The one or more non-transitory computer-readable media of claim 14, further comprising when the selected drone is unavailable for user control, indicating to the at least one user that the user is on a wait list for control of the selected drone.

16. The one or more non-transitory computer-readable media of claim 14, further comprising providing the at least one user with a direct control option; and upon receiving a selection of the direct control option, establishing communication between a mobile device associated with the at least one user and the selected drone.

17. The one or more non-transitory computer-readable media of claim 14, wherein the video from the selected drone is streamed to the display device via a set-top box.

18. The one or more non-transitory computer-readable media of claim 14, wherein the one or more drone options are presented on the display device via a set-top box.

19. The one or more non-transitory computer-readable media of claim 18, wherein the drone selection is received from a remote control associated with the set-top box.

20. The one or more non-transitory computer-readable media of claim 14, wherein the one or more control options are presented on the display device via a set-top box.

* * * * *